US010596662B2

(12) United States Patent
Haro Gonzalez et al.

(10) Patent No.: US 10,596,662 B2
(45) Date of Patent: Mar. 24, 2020

(54) ADAPTIVE MELTING BEAM CONFIGURATION FOR ADDITIVE MANUFACTURING

(71) Applicant: General Electric Company, Schenectady, NY (US)

(72) Inventors: Juan Vicente Haro Gonzalez, Zurich (CH); Felix Martin Gerhard Roerig, Baden (CH)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 15/483,066

(22) Filed: Apr. 10, 2017

(65) Prior Publication Data

US 2018/0290239 A1  Oct. 11, 2018

(51) Int. Cl.
| | |
|---|---|
| B23K 26/342 | (2014.01) |
| B23K 26/082 | (2014.01) |
| B22F 3/105 | (2006.01) |
| B23K 15/00 | (2006.01) |
| B23K 15/02 | (2006.01) |
| B23K 26/06 | (2014.01) |
| G05B 19/4099 | (2006.01) |
| B22F 5/00 | (2006.01) |
| B22F 5/04 | (2006.01) |

(Continued)

(52) U.S. Cl.
CPC .......... *B23K 26/342* (2015.10); *B22F 3/1055* (2013.01); *B23K 15/002* (2013.01); *B23K 15/0086* (2013.01); *B23K 15/02* (2013.01); *B23K 26/0604* (2013.01); *B23K 26/082* (2015.10); *B22F 5/009* (2013.01); *B22F 5/04* (2013.01); *B22F 2003/1056* (2013.01); *B22F 2003/1057* (2013.01); *B22F 2998/10* (2013.01); *B22F 2999/00* (2013.01); *B33Y 30/00* (2014.12); *B33Y 50/02* (2014.12); *G05B 19/4099* (2013.01); *Y02P 10/295* (2015.11)

(58) Field of Classification Search
None
See application file for complete search history.

(56) References Cited

U.S. PATENT DOCUMENTS

| | | |
|---|---|---|
| 5,536,467 A | 7/1996 | Reichle et al. |
| 9,011,136 B1 | 4/2015 | Uzan et al. |

(Continued)

FOREIGN PATENT DOCUMENTS

WO  WO-2016071265 A1 *  5/2016  ............ B22F 3/1055

*Primary Examiner* — Geoffrey S Evans
(74) *Attorney, Agent, or Firm* — Dale Davis; Hoffman Warnick LLC

(57) ABSTRACT

Various embodiments include approaches for controlling an additive manufacturing (AM) process. In some cases, an AM system includes: a process chamber for additively manufacturing a component, the process chamber at least partially housing a plurality of distinct melting beam scanners, each of the distinct melting beam scanners configured to emit a melting beam, wherein each of the distinct melting beam scanners is independently physically movable within a corresponding region of the process chamber; and a control system coupled with the plurality of distinct melting beam scanners, the control system configured to control movement of at least one of the plurality of distinct melting beam scanners within the corresponding region based upon a geometry of the component.

17 Claims, 5 Drawing Sheets

(51) Int. Cl.
*B33Y 30/00* (2015.01)
*B33Y 50/02* (2015.01)

(56) References Cited

U.S. PATENT DOCUMENTS

| | | | |
|---|---|---|---|
| 2004/0094728 A1* | 5/2004 | Herzog | B22F 3/1055 250/559.06 |
| 2009/0308853 A1* | 12/2009 | Jiang | B23K 26/046 219/121.75 |
| 2013/0101746 A1* | 4/2013 | Keremes | B22F 3/1055 427/457 |
| 2013/0112672 A1 | 5/2013 | Keremes et al. | |
| 2015/0151491 A1* | 6/2015 | Teulet | B22F 3/1055 700/120 |
| 2016/0114432 A1* | 4/2016 | Ferrar | B23K 26/082 219/76.12 |
| 2016/0303806 A1* | 10/2016 | Mercelis | G03F 7/0037 |
| 2016/0311059 A1* | 10/2016 | Obara | B23K 26/342 |
| 2017/0304897 A1* | 10/2017 | Walrand | B22F 3/1055 |
| 2018/0099332 A1* | 4/2018 | Shaw | B22F 3/1055 |
| 2018/0200792 A1* | 7/2018 | Redding | B29C 64/153 |
| 2018/0200835 A1* | 7/2018 | Chae | B33Y 10/00 |

\* cited by examiner

ADAPTIVE MELTING BEAM CONFIGURATION FOR ADDITIVE MANUFACTURING

FIELD OF THE INVENTION

The subject matter disclosed herein relates to manufacturing. More particularly, the subject matter disclosed herein relates to controlling additive manufacturing in melting beam-based systems.

BACKGROUND OF THE INVENTION

Traditional manufacturing has relied upon subtractive approaches for forming components in desired geometries. These subtractive approaches involve removing a portion of an initial, raw material, and can utilize cutting and/or machining tools to form holes, surfaces, geometries, etc. in that material. More recently, additive manufacturing approaches have begun to emerge as suitable alternatives or replacements for the traditional subtractive approaches. Additive manufacturing (AM) includes adding individual layers of a material over one another to form a desired component geometry. Powder-based AM utilizes a heat source (e.g., a melting beam such as a laser beam or electron beam) to melt layers of a base material (e.g., a powdered metal) to form a desired geometry, layer-by-layer. The melting beam forms a melt pool in the base material, which subsequently solidifies. Next, another layer of base material is placed (e.g., spread) over the underlying layer and melted to that layer to build up the part. This process is repeated for a number of layers until the component geometry is formed.

The size and geometry of a part formed by AM is at least partially dictated by the ability of the melting beam to cover the component footprint. Multi-melting beam AM systems are often used to help manufacture more complex components, or to speed the process of manufacturing. However, these multi-melting beam AM systems typically over-load one or more of the melting beams while under-loading other melting beam(s). This load imbalance can be inefficient, causing delays in manufacturing and idleness for one or more melting beams in the system.

BRIEF DESCRIPTION OF THE INVENTION

Various embodiments include approaches for controlling an additive manufacturing (AM) process. In some cases, an AM system includes: a process chamber for additively manufacturing a component, the process chamber at least partially housing a plurality of distinct melting beam scanners, each of the distinct melting beam scanners configured to emit a melting beam, wherein each of the distinct melting beam scanners is independently physically movable within a corresponding region of the process chamber; and a control system coupled with the plurality of distinct melting beam scanners, the control system configured to control movement of at least one of the plurality of distinct melting beam scanners within the corresponding region based upon a geometry of the component.

A second aspect of the disclosure includes a computer program product having program code, which when executed by at least one computing device, causes the at least one computing device to control an additive manufacturing (AM) system by: analyzing data describing a geometry of a component to be formed by the AM system, the analyzing including identifying the component is out of range of at least one of a plurality of distinct melting beam scanners in the AM system; and instructing the at least one of the plurality of distinct melting beam scanners to move to a location within range of the component for additively manufacturing a portion of the component in response to identifying the at least one of the plurality of distinct melting beam scanners is out of range.

A third aspect of the disclosure includes a system having: at least one computing device configured to control an additive manufacturing (AM) system having: a process chamber for additively manufacturing a component, the process chamber at least partially housing a plurality of distinct melting beam scanners, each of the distinct melting beam scanners configured to emit a melting beam, wherein each of the distinct melting beam scanners is independently physically movable within a corresponding region of the process chamber, the at least one computing device configured to: control movement of at least one of the plurality of distinct melting beam scanners within the corresponding region based upon a geometry of the component.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
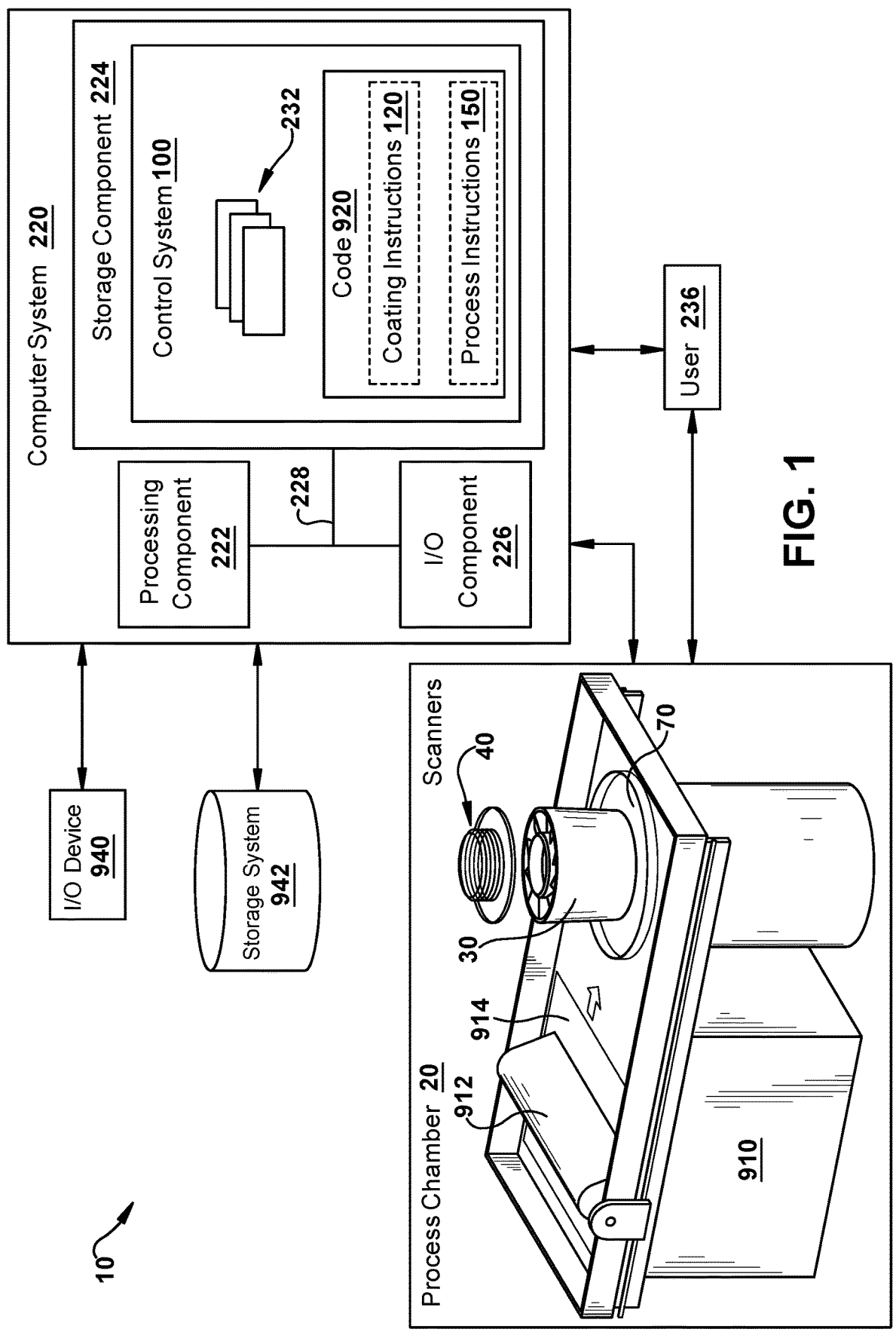
FIG. 1 shows a schematic depiction of an environment including a system according to various embodiments of the disclosure.

It is noted that the drawings of the various aspects of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated herein, the subject matter disclosed relates to manufacturing. More particularly, the subject matter disclosed herein relates to controlling manufacturing in multi-melting beam additive manufacturing (AM) systems.

In contrast to conventional approaches, various aspects of the disclosure include approaches for selectively controlling a position of one or more melting beam scanners in an AM system to efficiently manufacture one or more components. That is, in particular embodiments, approaches include systems, methods and computer program products for independently controlling melting beam scanners in an AM system, such as a direct metal laser melting (DMLM) system, a selective laser melting (SLM) system, electron beam melting (EBM) system or direct laser metal sintering (DMLS) system.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Figure 2:
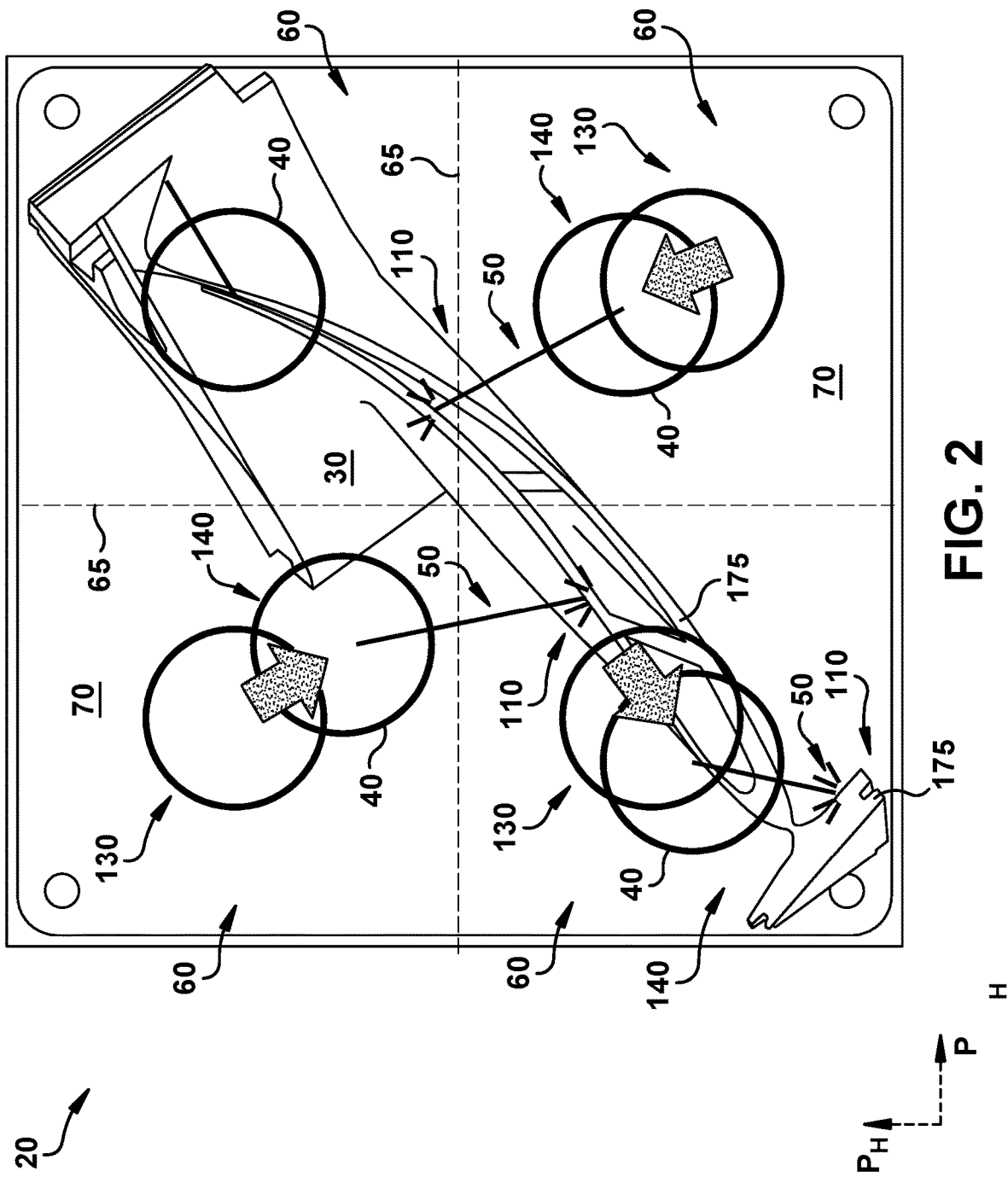
FIG. 2 shows a schematic depiction of a process chamber according to various embodiments of the disclosure.
Figure 4:
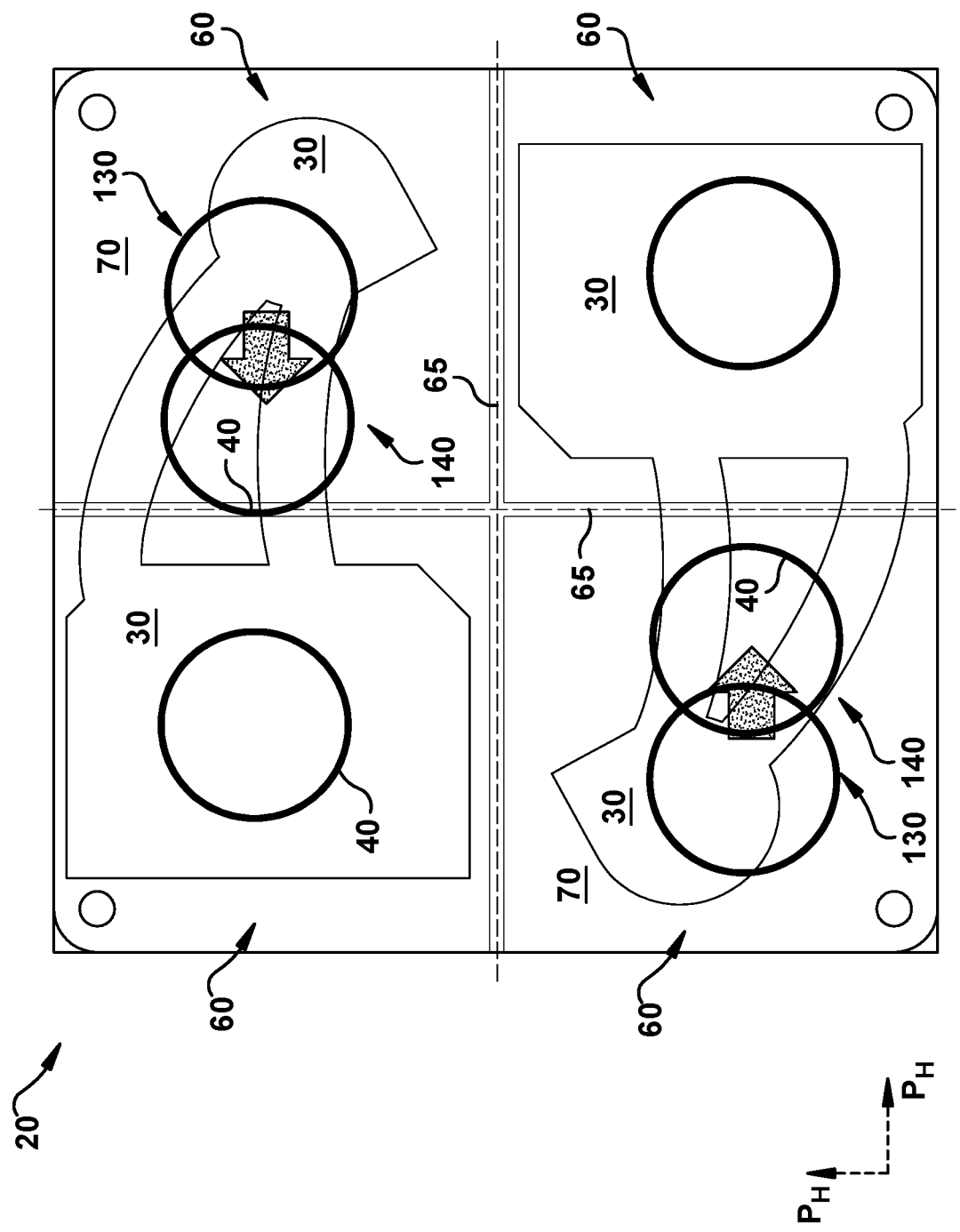
FIG. 4 shows a schematic depiction of a process chamber illustrating an example process according to various embodiments of the disclosure.
Figure 5:
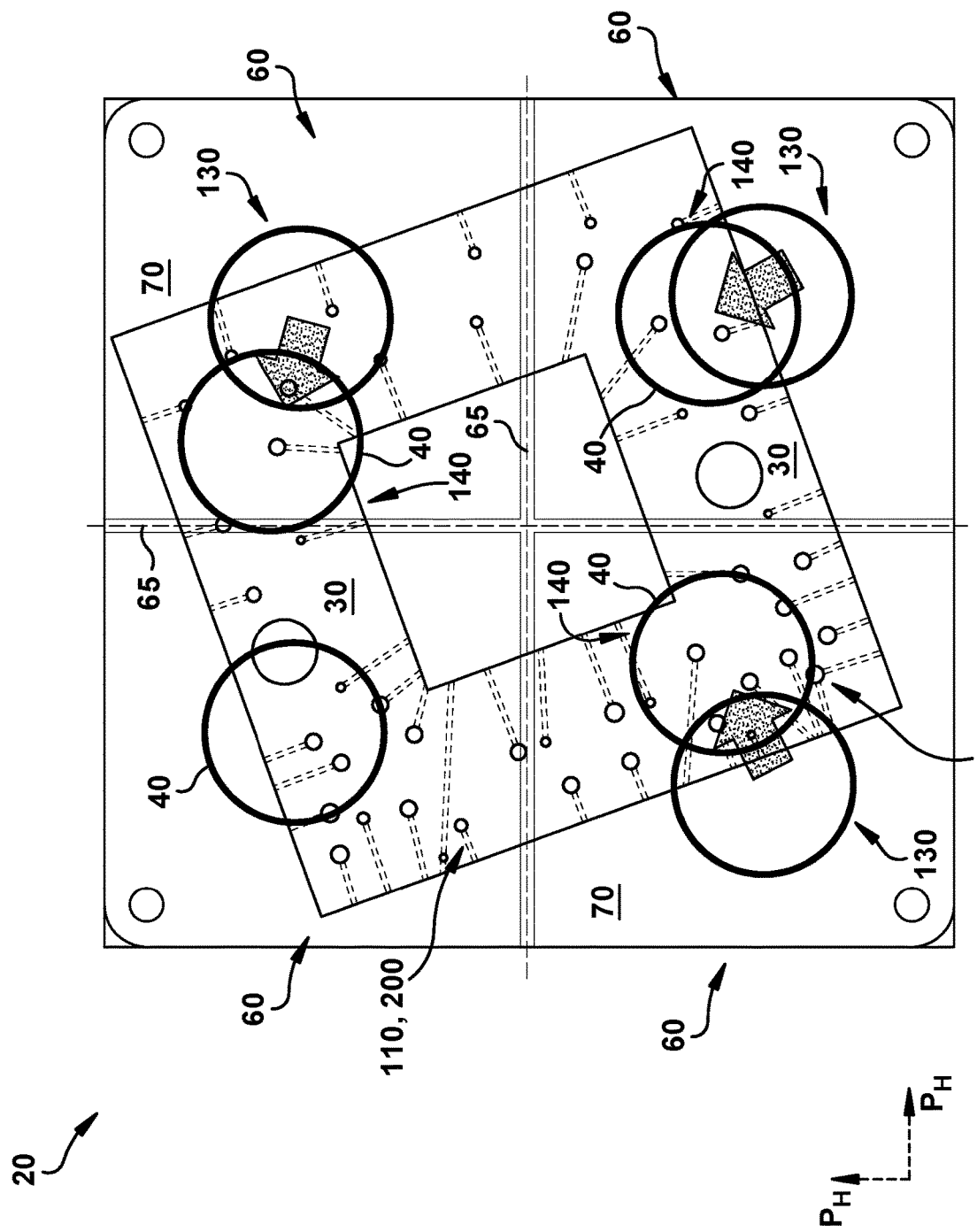
FIG. 5 shows a schematic depiction of a process chamber illustrating an example process according to various embodiments of the disclosure.

FIG. 1 shows a schematic depiction of an additive manufacturing (AM) system 10 according to various embodiments of the disclosure. As shown, AM system 10 can include a process chamber 20 for additively manufacturing a component 30. Process chamber 20 can at least partially house a plurality of distinct melting beam scanners 40 (shown as a set in FIG. 1, and as a plurality in FIGS. 2, 4 and 5), each configured to emit a melting beam 50, such as a laser beam or an electron beam (FIG. 2). FIG. 2 shows a schematic depiction of an interior of process chamber 20, and is referred to concurrently with FIG. 1. FIGS. 4 and 5 show additional examples of process chambers 20 according to various control approaches described herein. In some cases, component(s) 30 can include a machine component, or any other component capable of being formed by the additive manufacturing processes described herein. In some particular cases, component 30 can include a turbomachine component or a dynamoelectric machine component, including at least one of a stator component, rotor component, turbine blade, nozzle, bucket, shroud, flange, etc.

Turning to FIG. 2, each distinct melting beam scanner 40 is independently physically movable (e.g., translatable) within a corresponding region 60 of process chamber 20. That is, each distinct melting beam scanner 40 can be physically moved so as to modify the field of that melting beam scanner 40 relative to a build platform 70 (within process chamber 20), independently of the other melting beam scanner(s) 40 in process chamber 20. In some cases, a single melting beam scanner 40 can be physically moved according to a prescribed control command, or one or more melting beam scanners 40 can be physically moved according to one or more prescribed control commands In some particular embodiments, each distinct melting beam scanner 40 is physically movable only within its corresponding region 60 of process chamber 20, such that its movement is limited within chamber 20. In some cases, each region 60 abuts (e.g., contacts, or shares a boundary 65 with) a neighboring region 60 corresponding with another one of melting beam scanners 40. In more particular cases, each distinct melting beam scanner 40 cannot overlap another melting beam scanner 40 along the horizontal plane $P_H$-$P_H$. Regions 60 can take any geometry, and may not reflect quadrants as shown in the example depiction in FIG. 2. As noted herein, process chamber 20 can further include build platform 70, where melting beam scanners 40 are suspended over build platform 70. As is known in the art, and further illustrated in the schematic depiction of an example melting beam scanner 40 in FIG. 3, each melting beam scanner 40 can include a melting beam source (e.g., laser light source or electron beam source) 80 for providing melting beam 50 (FIG. 2). In the case that melting beam source 80 is a laser beam source (and melting beam 50 is a laser beam, melting beam scanner(s) 40 can further include a mirror 90 for deflecting melting beam 50 within process chamber 20. However, in other embodiments, where the melting beam scanner 40 is an electron beam scanner, an electro-magnetic field or electric coils may provide melting beam 50, as is known in the art.

Returning to FIGS. 1 and 2, AM system 2 can further include a control system 100 coupled with melting beam scanners 40 (via process chamber 20 and computer system 220). Control system 100 can be physically coupled (e.g., via conventional mechanical couplings), communicatively coupled (e.g., via conventional wireless and/or hardwired means) and/or electrically coupled with melting beam scanners 40 in order to provide operating instructions and/or otherwise control operation of (and gather data from) melting beam scanners 40. Control system 100 is configured to control movement of melting beam scanner(s) 40 within its corresponding region 60 based upon a geometry (e.g., a three-dimensional geometry) of component 30, or a plurality of similar component(s) 30 or distinct components (e.g., having distinct three-dimensional geometries). That is, in particular embodiments, control system 100 is configured to move melting beam scanner(s) 40 relative to at least one additional melting beam scanner 40 to additively manufacture a portion 110 of component 30 (FIG. 2). As described herein, the portion 110 of component 30 may include one or more portions of a layer of component 30, or one or more portions of multiple layers of component 30. In some cases, portion 110 can also include a part of multiple component(s) 30 in the same build model (three-dimensional geometry). FIGS. 4 and 5 illustrate additional example configurations, whereby two scanners 40 (FIG. 4) and three scanners (FIG. 5) are relocated to perform an additive manufacturing process on one or more layers of component 30, thereby balancing (or reducing imbalance between) the workload of scanners 40.

In some cases, control system 100 is configured analyze data (component data 120) describing the geometry (e.g., three-dimensional geometry, including coordinates) of component 30 in order to control the position of melting beam scanners 40. The component data 120 can include a computer-aided design (CAD) file or other data file describing the three-dimensional geometry of component 30. In various embodiments, component data 120 can include data about two-dimensional layers of component 30 which collectively form component 30, and form the basis of scan vectors used to form those layers. In in various embodiments, control system 100 is configured to analyze component data 120 to determine whether component 30 is out of (effective) range of one or more melting beam scanners 40 (e.g., as compared with a threshold range, or beam field range, of melting beam 50), such that the melting beam scanner(s) 40 cannot effectively aid in additively manufacturing portion 110 of component 30. Where component data 120 indicates that component 30 is out of range of melting beam scanner(s) 40 (e.g., scanner 40 is at an out-of-range location 130), control system 100 moves (e.g., via process instructions 150 or direct control) melting beam scanner 40 to a location 140 within range of component 30 in order to additively manufacture that portion 110. In these cases, control system 100 controls the movement of melting beam scanner(s) 40 within its corresponding region 60, and in various embodiments, control system 100 can further control alignment and calibration of scanner(s) 40 with respect to one another. In other embodiments, component data 120 may indicate that one or more melting beam scanners 40 will operate inefficiently in manufacturing component 30, e.g., that one or more melting beam scanners 40 will be idle for longer than a threshold period, and control system 100 moves the corresponding melting beam scanner(s) 40 within region 60 to a location 140 where melting beam 50 can effectively contribute to the additive manufacturing of component 30 (e.g., portion 110). In various embodiments, control system 100 can include one or more algorithms for analyzing the workload of each scanner 40 (e.g., for one or more parts of component 30) based upon component data 120 and adjusting relative distances between scanners 40 to distribute the workload of each scanner more evenly, e.g., in order to minimize idle time. In various embodiments, the component data 120 can be iteratively updated such that control system 100 includes a self-learning function which accounts for the time required to manufacture each layer of component 30. For example, where one or more layer(s) of material used to form component 30 is identical across a set of components 30, or where a set of components 30 are scheduled to be additively manufactured, component data 120 can be continuously updated by control system 100 to incorporate information about positions of scanners 40, calibration time between scanners 40, periods of down time or transition, etc. in order to improve the efficiency of control system 100 in manufacturing a repetitive layer of component 30 or a repetitive version of component 30. Various factors can be considered by control system 100 in moving scanner(s) 40, including, e.g., the size of the cross-section (portion 110) of component 30 to be processed by each scanner 40 and the process parameters for each portion 110 of component 30, depending upon the features of component 30. In some cases, for every material, each scanner 40 may have the same set of process parameters. However, depending upon the features in a particular portion 110 of component 30 (e.g., contour, volume section, inclined geometry, apertures 200 (e.g., FIG. 5) etc.), each scanner 40 may process the material with a different speed and/or power. Control system 100 can actively manage the position of scanner(s) 40 such that processing time for each scanner 40 is as near to equal as possible. This can include analyzing portions 110 of component 30 for features such as contours, volume sections, inclined geometry, etc. to determine which scanner(s) 40 will process the material for a given period, and determining which scanner(s) 40 should be relocated to better balance the processing time across all scanners 40 (thereby minimizing downtime). Some example processing approaches performed by control system 100 (and which may be combined in various configurations) can include:

A) Layer-by-layer: scanner(s) 40 are moved for each layer of component 30. This may be particularly useful where the benefit in process time reduction is greater than the time required to move scanner(s) 40. This approach may also account for relocating time, which can be between seconds and minutes, when moving scanner(s) 40. In various embodiments, control system 100 compares the calculated time for moving scanner(s) 40 with an estimated savings in process time (based upon component data 120), and where the savings in process time exceeds the calculated moving time, control system 100 initiates movement of scanner(s) 40. This approach may further account for the time required to deposit the material (powder) for an overlying layer, e.g., approximately ten (10) seconds. Control system 100 can be configured to relocate one or more scanner(s) 40 during the period in which the subsequent layer of powder is deposited over an underlying (finished) layer, thereby increasing the efficiency of the scanning operation. In some example embodiments, a process of relocating scanners 40 can include: a) positioning scanners 40; b) measuring position (e.g., relative or absolute) of scanners 40; c) repeat processes (a) and (b) until desired position is reached; and d) compute a new scan field based upon the desired position. In some cases, additional processes can include iteratively measuring the position of laser beam(s) 50 (e.g., relative or absolute) within process chamber 70, re-computing the scan field based upon the measurement of beam(s) 50, and moving scanner(s) 40 to a desired position based upon the beam 50 measurements.

B) Groups-of-layers: scanner(s) 40 are moved to a location where they can enhance the formation of multiple layers of component 30. As with the layer-by-layer approach, the groups-of-layers approach should account for relocating time, which can be up to ten (10) seconds when moving scanner(s) 40. Similarly, as with the layer-by-layer approach, control system 100 can initiate movement of scanner(s) 40 when the savings in processing time is greater than the time required to move scanner(s) 40 to the new configuration.

C) Part-by part or job-by-job: scanner(s) 40 are positioned in locations which best balance the processing time across all scanners 40 prior to initiating the formation of component 30 (e.g., prior to processing a first layer of component).

D) Advanced movement: at least one scanner 40 which is idle during processing of a portion of component 30 (e.g., processing one or more layers and/or processing one or more features) can be moved to a position for forming a later feature or layer in advance of the working scanner(s) 40 finishing the current feature/layer. This may enhance efficiency in manufacturing that next layer or feature, reducing overall idle time.

Additionally, in all example processing configurations, control system 100 may also plan for movement of scanners 40 during scheduled transition periods or downtime. For example, cooling periods to prevent overheating of system components, or filter cleaning may take several minutes, and may be either scheduled in advance or triggered by one or more sensors during operation of AM system 10. In various embodiments, control system 100 can schedule movement of scanner(s) 40 during those transition periods or downtime to enhance the efficiency of AM system 10.

In various embodiments, moving scanner(s) 40 within a range will also translate the overlapping/stitching regions between scanner(s) 40. In various embodiments, control system 100 can analyze potential process instructions 150 prior to implementing movement of scanner(s) 40 to avoid placing these overlapping regions proximate critical features of component 30, e.g., cooling holes or other delicate features.

In some cases, component 30 includes a multi-layer component, and control system 100 is configured to control movement of melting beam scanner(s) 40 within region(s) 60 for each layer of the component 30. That is, AM system 10 may include a direct metal melting beam melting (DMLM), direct metal laser melting (DMLM) system, a selective laser melting (SLM) system, electron beam melting (EBM) system or direct laser metal sintering (DMLS) system, which includes depositing a material (e.g., a metal) as a powder, and instructing at least one of the melting beam scanners 40 to emit melting beam 50 to melt the powder. The melted powder is then solidified, a subsequent layer of powder is applied, and that subsequent layer is melted (via melting beam(s) 50) to bond with the underlying layer. This process is repeated for a plurality of layers to form a component, e.g., component 30. Control system 100 can analyze component data 120 to determine, on a level-by-level basis, whether one or more scanners 40 should be moved within corresponding region(s) 60, between positions 130, 140 (and/or other positions) to aid in forming a portion (e.g., portion 110) of that layer of component 30.

In some cases, melting beam scanners 40 can have a substantially uniform power level, e.g., substantially equally powered melting beam or electron beam light sources 80.

However, in other embodiments, at least one melting beam scanner 40 has a different power level, or is operated at a different power level, relative to a remainder of scanner(s) 40. In some cases, to enhance the flexibility of AM system 10, control system 100 can be configured to modify the power level of beam light source 80 (e.g., melting beam or electron beam) and/or the scanning speed of scanner(s) 40 based upon a position of one or more scanner(s) 40 relative to component 30, as well as modifying the position of scanner(s) 40 within each region 60.

As noted herein, control system 100 is configured to analyze component data 120 (e.g., about one or more components 30) to identify whether component 30 (e.g., portion 110 of component, or layer of component 30) is out of range of at least one of scanner(s) 40, and in response to that identification, move the scanner(s) 40 to location 140 within range of component 30 (e.g., portion 110 of component, or layer of component 30). Component data 120 may include information about the geometry (e.g., three-dimensional geometry, such as size and coordinates), geometry of at least one component 30 and the location of component(s) 30 in process chamber 20, on an entire-component basis and/or a level-by-level basis.

Figure 3:
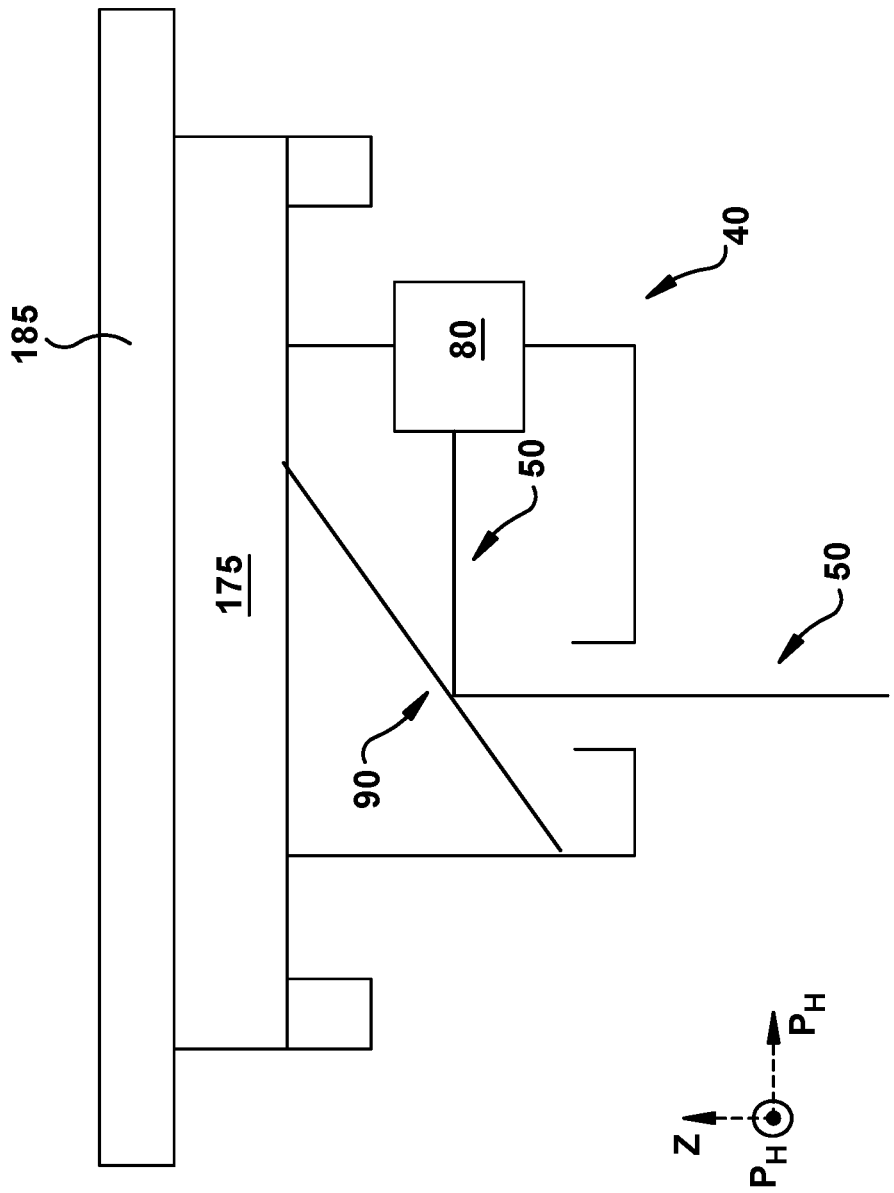
FIG. 3 shows a schematic depiction of a melting beam scanner according to various embodiments of the disclosure.

Looking at FIGS. 1-5, in contrast to conventional systems, AM system 10 can actively control the position of scanner(s) 40 to aid in the manufacture of one or more layers of component 30. For example, component 30 is shown as partially manufactured in FIG. 2, indicating that a particular layer 175 is being formed. Conventional AM systems include a plurality of scanners, which are fixed at positions (e.g., locations 130) within process chamber 20, and unable to translate along the $P_H$-$P_H$ plane. In these conventional AM systems, when forming portions of layer 175, for example, the melting beam scanner in the top-left region 60 (as shown in FIG. 2) would be unable to effectively melt the base material to the underlying layer located in other regions 60 of process chamber 20. This could be because the melting beam scanner in the top-left region 60 cannot effectively reach the base material in another region 60, or because it is more efficient for one of the other melting beam scanners (e.g., bottom right region 60) to perform all of the melting in its corresponding region 60. However, in this conventional approach, that top-right melting beam scanner would sit idle for a period while one or more remaining melting beam scanners would be overworked (e.g., operating for longer than desired periods, or melting a larger than desired amount of base material). This conventional configuration can be inefficient, and can also reduce the usable lifespan of one or more melting beam scanners. In contrast to this conventional configuration, AM system 10 includes a set of (independently) physically movable (e.g., translatable) melting beam scanners 40, controlled by control system 100, to effectively share the load of additively manufacturing component 30. In various embodiments, melting beam scanners 40 are independently translatable along the $P_H$-$P_H$ plane (e.g., in a direction parallel with build platform 70). In one example, as illustrated in FIG. 3, melting beam scanner(s) 40 can be movably coupled (e.g., via conventional mechanical coupling, such as screwing, bolting, fastening, press-fitting, mating, etc.) with a mount 175, which can include rollers, bearings, rails, magnets, etc. for allowing melting beam scanner(s) 40 to move relative to other melting beam scanner(s) 40. In some cases, mount 175 is coupled to a ceiling 185 of process chamber 20 (via any conventional coupling mechanism described herein) and allows for movement of melting beam scanner 40 in at least one dimension, and in many cases, in at least two dimensions (along the $P_H$-$P_H$ plane). In some cases, mount 175 allows for movement of melting beam scanner 40 in three dimensions (e.g., additional Z direction). In some examples, mount 175 allows for movement of scanner(s) 40 in approximately +/−50 millimeters (mm) in the X direction, +/−50 mm in the Y direction and +/−50 millimeters (mm) in the X-Y direction, with additional movement in the Z direction possible. In various embodiments, AM system 10 may also include conventional sensors (e.g., optics sensors) coupled with control system 100 and configured to measure the position of scanner(s) 40 relative to other scanner(s) 40, component 30 and/or build platform 70 to provide feedback to control system 100 on the movement of scanner(s) 40, and/or a position of the laser beams 50 within process chamber 70, either relative to other beams 50 or a fixed reference point or other coordinate system. In some cases, scanners 40 can include sensors for measuring their position relative to a fixed reference point or other coordinate system (e.g., local coordinate positioning system). In any case, AM system 10, which controls movement of melting beam scanners 40, can enhance efficiency in additively manufacturing components (e.g., component 30) and extend the usable lifespan of melting beam scanners 40, when compared with conventional systems and approaches.

In various embodiments, control system 100 is also be configured to align melting beam scanners 40, either simultaneously with movement of the scanners 40, or shortly thereafter. This can include analyzing the scan field of the now-relocated scanner(s) 40, and modifying the scan field in order to effectively distribute the melting beams 50 to form component 30. In these cases, control system 100 may include a control algorithm for computing changes to the scan field as one or more scanner(s) 40 is relocated, and modifying process instructions 150 to update the scan field(s) for one or more scanner(s) 40 that are updated based upon the change in position(s). This process can also include calibrating and aligning scanner(s) 40 with respect to the other scanner(s) 40 in order to enhance efficiency in forming component 30.

Returning to FIG. 1, control system 100 can include any conventional electrical and/or mechanical control systems, and in various embodiments, may include logic configured to provide instructions to process chamber 20 according to particular inputs, as described herein. As shown, control system 100 can reside within a computer system 220, which is coupled with process chamber 20. In various embodiments, process chamber 20 and computer system 220 are contained within the same physical structure, but in other cases, these components can be physically separated but communicatively connected by any conventional means. Computer system 220 is shown including a processing component 222 (e.g., one or more processors), a storage component 224 (e.g., a storage hierarchy), an input/output (I/O) component 226 (e.g., one or more I/O interfaces and/or devices), and a communications pathway 228. In one embodiment, processing component 222 executes program code, such as control system 100, which is at least partially embodied in storage component 224. While executing program code, processing component 222 can process data, which can result in reading and/or writing the data to/from storage component 224 and/or I/O component 226 for further processing. Pathway 228 provides a communications link between each of the components in computer system 220. I/O component 226 can comprise one or more human I/O devices or storage devices, which enable a user 236 (e.g., human or machine user) to interact with computer system 220 and/or one or more communications devices to enable user 236 (e.g., human or machine user) to communicate with computer system 220 using any type of communications link. To this extent, control system 100 can manage a set of interfaces (e.g., graphical user interface(s), application program interface, and/or the like) that enable human and/or system interaction with control system 100.

In any event, computer system 220 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, control system 100 can be embodied as any combination of system software and/or application software. In any event, the technical effect of computer system 220 is to control additive manufacturing of component 30, as described herein.

Further, control system 100 can be implemented using a set of modules 232. In this case, a module 232 can enable computer system 220 to perform a set of tasks used by control system 100, and can be separately developed and/or implemented apart from other portions of control system 100. Control system 100 may include modules 232 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 220.

When computer system 220 comprises multiple computing devices, each computing device may have only a portion of control system 100 embodied thereon (e.g., one or more modules 232). However, it is understood that computer system 220 and control system 100 are only representative of various possible equivalent computer systems that may perform a process described herein. To this extent, in other embodiments, the functionality provided by computer system 220 and control system 100 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 220 includes multiple computing devices, the computing devices can communicate over any type of communications link. Further, while performing a process described herein, computer system 220 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, control system 100 enables computer system 220 to control the additive manufacture of a component 30 within process chamber 20. Control system 100 may include logic for performing one or more actions described herein. In one embodiment, control system 100 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, repair control system 40 and logic included therein will be described herein as a specific use machine. As will be understood from the description, while logic is illustrated as including each of the above-stated functions, not all of the functions are necessary according to the teachings of the embodiments of the invention as recited in the appended claims.

In various embodiments, processes described herein can be iterated (repeated) periodically (e.g., according to schedule of x times per y period, and/or continuously) in order to aid in additive manufacture of one or more component(s) 30. In some cases, one or more of the processed described herein can be repeated, for example, for a set of components 30 (e.g., turbomachine components such as a set of steam turbine blades).

It is understood that component 30 (FIGS. 1-2) may be formed using an additive manufacturing (AM) process, including any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic, much of which is cut away and discarded, the only material used in additive manufacturing is what is required to geometry the part. Additive manufacturing processes may include but are not limited to: 3D printing, rapid prototyping (RP), direct digital manufacturing (DDM), selective melting beam melting (SLM) electron beam melting (EBM), direct laser metal sintering (DMLS) and direct metal melting beam melting (DMLM). As described herein, in the current setting, melting beam-based approaches such as DMLM or SLM have been found advantageous.

Returning to FIG. 1, additional details of components within process chamber 20 are shown according to various embodiments. As noted herein, in some cases, AM system 10 is arranged for DMLM/SLM. It is understood that the general teachings of the disclosure are equally applicable to other forms of additive manufacturing using melting beam scanners 40. AM system 10, as will be described, executes code 920 that includes a set of computer-executable instructions defining component 30 (component data 120), as well as process instructions 150 for performing an AM process to form component 30, as described herein. Each AM process may use different raw materials in the form of, for example, fine-grain powder, wire, a stock of which may be held in a chamber 910 of process chamber (e.g., AM printer). In the instant case, component 30 may be made of plastic/polymers or similar materials. As illustrated, within process chamber 20, an applicator 912 may create a thin layer of raw material 914 spread out as the blank canvas from which each successive slice of the final object will be created. In other cases, applicator 912 may directly apply or print the next layer onto a previous layer as defined by code 920 (including, e.g., component data 120), e.g., where the material is a polymer. In the example shown, a set of melting beam scanners 40 fuses particles for each slice, as defined by code 920. Various parts of process chamber 20 may move to accommodate the addition of each new layer, e.g., build platform 70 may lower and/or chamber 910 and/or applicator 912 may rise after each layer.

AM control system 100 is shown implemented on computer system 220 as computer program code. In some cases, computer system 220 is shown in communication with an external I/O device/resource 940 and a storage system 942. In general, processor 222 executes computer program code, such as AM control system 100, that is stored in storage component 224 and/or storage system 942 under instructions from code 920 representative of component 30 (FIGS. 1-2), described herein. While executing computer program code, processor 222 can read and/or write data to/from storage component 224, storage system 942, I/O device 940 and/or process chamber 20.

Additive manufacturing processes begin with a non-transitory computer readable storage medium (e.g., storage component 224, storage system 942, etc.) storing code 920 (e.g., including component data 120 and/or process instructions 150) representative of component 30. As noted, code 920 includes a set of computer-executable instructions defining component 30 and positioning of one or more melting beam scanners 40, upon execution of the code by system 10. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the geometry and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 10 and may come from a part designer, an intellectual property (IP) provider, a design company, the operator or owner of system 10, or from other sources. In any event, AM control system 100 executes code 920, dividing fill material for component 30 (FIGS. 1-2) into a series of thin slices that it assembles using process chamber 20 in successive layers of liquid, powder, sheet or other material. In the DMLM/SLM example, each layer is melted to the exact geometry defined by code 920 and fused to the preceding layer. Subsequently, the component 30 may be exposed to any variety of finishing processes, e.g., minor machining, sealing, polishing, assembly to other part of the igniter tip, etc.

It is understood that in the process embodiments described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An additive manufacturing (AM) system comprising:
   a process chamber for additively manufacturing a component, the process chamber at least partially housing a plurality of distinct melting beam scanners, each of the distinct melting beam scanners configured to emit a melting beam, wherein each of the distinct melting beam scanners is independently physically movable within a corresponding region of the process chamber, wherein each region of the process chamber corresponding with one of the plurality of distinct melting beam scanners abuts a neighboring region of the process chamber corresponding with another one of the plurality of distinct melting beam scanners; and
   a control system coupled with the plurality of distinct melting beam scanners, the control system configured to control movement of at least one of the plurality of distinct melting beam scanners within the corresponding region based upon a geometry of the component, wherein in response to data describing the geometry of the component indicating the component is out of range of one of the plurality of distinct melting beam scanners, the control system is configured to move the one of the plurality of distinct melting beam scanners to a location within range of the component for additively manufacturing a portion of the component.

2. The AM system of claim 1, wherein each of the plurality of distinct melting beam scanners includes a beam light source for providing the melting beam and a mirror for deflecting the melting beam within the process chamber.

3. The AM system of claim 2, wherein the process chamber further includes a build platform.

4. The AM system of claim 3, wherein the plurality of distinct melting beam scanners are suspended over the build platform, and wherein the control system is configured to move the at least one of the plurality of distinct melting beam scanners relative to at least one additional one of the plurality of distinct melting beam scanners to additively manufacture a portion of the component.

5. The AM system of claim 1, wherein the control system controls the movement of the one of the plurality of distinct melting beam scanners within the corresponding region to manage a processing time in additively manufacturing the component.

6. The AM system of claim 1, wherein the component includes a multi-layer component, and wherein the control system is configured to control movement of the at least one of the plurality of distinct melting beam scanners within the corresponding region for each layer of the multi-layer component.

7. The AM system of claim 1, wherein the control system is further configured to control at least one of alignment or calibration of the plurality of distinct melting beam scanners simultaneously with, or after, the movement of at least one of the plurality of distinct melting beam scanners.

8. The AM system of claim 1, wherein the additively manufacturing of the component includes direct metal melting beam melting or direct metal melting beam deposition, wherein a material is deposited as a powder, and the control system instructs at least one of the melting beam scanners to emit the melting beam to melt the powder.

9. A computer program product comprising program code stored on a non-transitory computer readable medium, which when executed by at least one computing device, causes the at least one computing device to control an additive manufacturing (AM) system by:

analyzing data describing a geometry of a component to be formed by the AM system, the analyzing including identifying the component is out of range of at least one of a plurality of distinct melting beam scanners in the AM system; and instructing the at least one of the plurality of distinct melting beam scanners to move to a location within range of the component for additively manufacturing a portion of the component in response to identifying the at least one of the plurality of distinct melting beam scanners is out of range.

10. The computer program product of claim 9, wherein the AM system includes a process chamber, wherein each of the plurality of distinct melting beam scanners is configured to emit a melting beam and is independently physically movable within a corresponding region of the process chamber, and wherein the instructing moves the at least one of the plurality of distinct melting beam scanners within the corresponding region.

11. The computer program product of claim 10, wherein each region of the process chamber corresponding with one of the plurality of distinct melting beam scanners abuts a neighboring region of the process chamber corresponding with another one of the plurality of distinct melting beam scanners.

12. The computer program product of claim 11, wherein the instructing includes moving the one of the plurality of distinct melting beam scanners within the corresponding region.

13. The computer program product of claim 12, wherein the computer program product is further configured to cause the at least one computing device to at least one of align or calibrate the plurality of distinct melting beam scanners simultaneously with, or after, the movement of at least one of the plurality of distinct melting beam scanners.

14. The computer program product of claim 9, wherein the process chamber further includes a build platform, wherein the plurality of distinct melting beam scanners are suspended over the build platform, and wherein the instructing includes moving the at least one of the plurality of distinct melting beam scanners relative to at least one additional one of the plurality of distinct melting beam scanners to additively manufacture the portion of the component.

15. The computer program product of claim 9, wherein the additively manufacturing of the component includes direct metal laser melting, selective laser melting or direct metal melting beam deposition, wherein a material is deposited as a powder, and the at least one computing device is further configured to instruct at least one of the melting beam scanners to emit the melting beam to melt the powder.

16. A system comprising:

at least one computing device configured to control an additive manufacturing (AM) system having: a process chamber for additively manufacturing a component, the process chamber at least partially housing a plurality of distinct melting beam scanners, each of the distinct melting beam scanners configured to emit a melting beam, wherein each of the distinct melting beam scanners is independently physically movable within a corresponding region of the process chamber, wherein each region of the process chamber corresponding with one of the plurality of distinct melting beam scanners abuts a neighboring region of the process chamber corresponding with another one of the plurality of distinct melting beam scanners, the at least one computing device configured to:

control movement of at least one of the plurality of distinct melting beam scanners within the corresponding region based upon a geometry of the component; and move the one of the plurality of distinct melting beam scanners to a location within range of the component for additively manufacturing a portion of the component in response to data describing the geometry of the component indicating the component is out of range of the one of the plurality of distinct melting beam scanners.

17. The system of claim 16, wherein the at least one computing device moves the one of the plurality of distinct melting beam scanners only within the corresponding region.

* * * * *